United States Patent [19]

Idel

[11] 4,050,333
[45] Sept. 27, 1977

[54] METHOD OF SETTING SAW TEETH AND DEVICE FOR REALIZATION THEREOF

[76] Inventor: Vladimir Viktorovich Idel, ulitsa Gertsena, 3, kv. 37, Zavolzhie Gorkovskoi oblasti, U.S.S.R.

[21] Appl. No.: 555,611

[22] Filed: Mar. 5, 1975

[30] Foreign Application Priority Data

Mar. 12, 1974  U.S.S.R. ............................. 2006502
Mar. 12, 1974  U.S.S.R. ............................. 2006504

[51] Int. Cl.² ................................................ B23D 63/00
[52] U.S. Cl. ......................................... 76/112; 72/386
[58] Field of Search ........................... 72/386, 387, 380; 76/71, 61, 77, 112, 58, 66, 75

[56] References Cited

U.S. PATENT DOCUMENTS

| | | | |
|---|---|---|---|
| 561,147 | 6/1896 | Wallace | 76/61 |
| 569,766 | 10/1896 | Pineo | 76/61 |
| 579,220 | 3/1897 | Chellieu | 76/61 |
| 616,935 | 1/1899 | Kent | 76/77 |
| 660,310 | 10/1900 | Ranz | 76/71 |
| 1,494,995 | 5/1924 | Craddock | 76/61 |
| 2,109,161 | 2/1938 | Biro | 76/61 |
| 3,630,103 | 12/1971 | Idel | 76/66 |

FOREIGN PATENT DOCUMENTS 544,780  6/1956  Italy ............................. 76/61

*Primary Examiner*—C.W. Lanham
*Assistant Examiner*—Gene P. Crosby
*Attorney, Agent, or Firm*—Haseltine, Lake & Waters

[57] ABSTRACT

A method wherein the dynamic effect is applied to a zone on the edge of the saw tooth flank located at a certain distance from the tooth point which makes it possible to set the saw teeth after hardening their points to 60 HRc. The impact elements of the device for the realization of said method have surfaces acting on the edges of the saw tooth flanks, inclined to the plane of the saw cross section and having a convex curvilinear profile in cross section.

2 Claims, 4 Drawing Figures

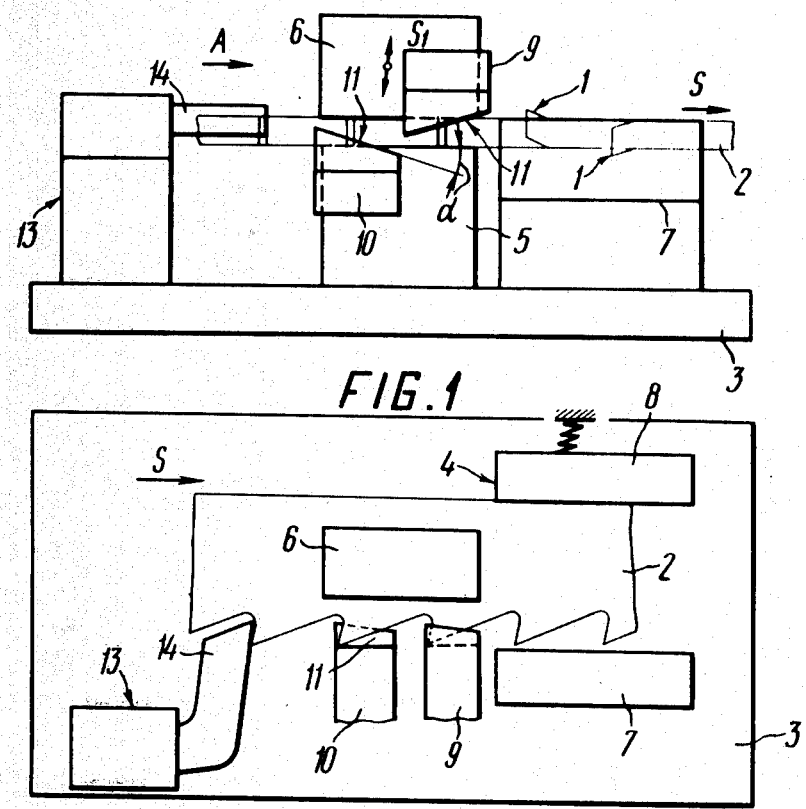
FIG.1
FIG.2
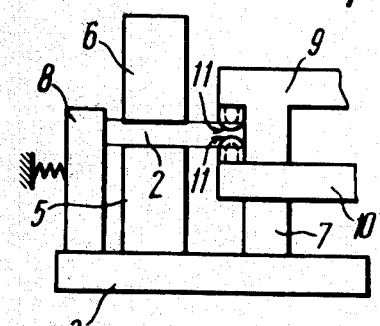
FIG.3
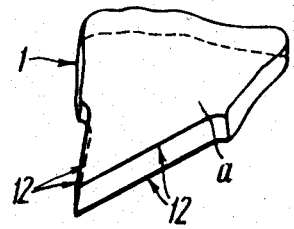
FIG.4

METHOD OF SETTING SAW TEETH AND DEVICE FOR REALIZATION

The present invention relates to the method of setting the teeth of a saw and to the device for the realization thereof.

The method according to the invention is suitable for setting the teeth of both band and circular saws.

Known in the previous art is a method of setting the teeth of band and circular saws wherein the dynamic effect, i.e. impact is applied to the front or rear edge of the tooth flank, depending on the plastic properties of the saw material. The dynamic effect is applied to the front edge of the tooth flank when the plastic properties of the saw material are comparatively high.

The dynamic effect is applied to the rear edge of the tooth flank when the material of the saw is comparatively brittle, also when the saw teeth are simultaneously set and sharpened.

In the above-described method of setting saw teeth the dynamic effect is applied to a portion of the edge, beginning from the tooth point and further along this edge.

Known in the art is a device for the realization of the above-described method. This device comprises a flexible clamping device for holding the saw in the course of tooth setting in a partly floating position, and at least two impact elements. Said impact elements are arranged on both sides of the saw blade and installed with a provision for reciprocating in the opposite directions relative to each other.

The surfaces of the impact elements acting on the edges of the tooth flanks are inclined towards the saw blade and to the plane of the saw cross section (see, for example, Pat. No. 2,007,410, Federal Republic of Germany).

This method of tooth setting is used for the saws made of carbon steel with a carbon content of 0.7-1.0 percent and hardened to 50 HRc.

The saws made of tungsten-containing (high-speed) and carbon steels with their tooth points hardened to 60 HRc cannot be set by the above-described method since it will result in chipping off of the tooth points.

At present, the teeth of the saws made of tungsten-containing and carbon steels are first set, then hardened to a maximum, e.g. to 60 HRc. In the process of hardening the teeth are deformed which, in turn, reduces considerably the accuracy of tooth setting.

An object of the present invention resides in eliminating the aforesaid disadvantages.

An object of the present invention lies in providing a method of setting the teeth of a saw and a device for the realization thereof wherein the dynamic effect applied to the edge of the tooth flank would allow setting the teeth of the saws made of high-speed and carbon steels with the tooth points hardened to 60 HRc.

In accordance with these and other objects we provide a method of saw teeth setting wherein the dynamic effect is applied to the edge of the flank of a free-positioned saw tooth so as to cause bending and twisting of the latter in which, according to the invention, the dynamic effect is applied to a portion of the edge of the tooth flank located at a certain distance from the tooth point.

In the device for setting the saw teeth which is a realization of the above-described method, in which a bed mounts a flexible clamping device for keeping the saw in a floating position in the course of tooth setting and there are at least two impact elements installed with a provision for reciprocating in the opposite directions relative to each other and provided with surfaces acting on the edge of the respective flank of the saw tooth and inclined to the plane of the saw cross section, according to the invention, the surface of each impact element acting on the edge of the tooth flank has a convex curvilinear profile in cross section. There is furthermore provided means for driving the saw pitch feed mechanism and impact elements.

The method of saw tooth setting and the device for the realization thereof according to the present invention ensure setting of the saw teeth after hardening their points to 60 HRc. Setting of the teeth after their hardening ensures a high setting accuracy and makes it possible to combine tooth setting with sharpening.

The method of saw tooth setting according to the invention improves considerably the cutting properties of the saw and extends its service life.

Other objects and advantages of the present invention will become apparent from the description of its embodiment with reference to the accompanying drawings, in which:

FIG. 1 is a front schematic view of the device for setting the saw teeth according to the invention;

FIG. 2 — same, top view;

FIG. 3 — same, view along arrow A in FIG. 1;

FIG. 4 shows a saw tooth, enlarged.

The method of setting the teeth 1 (FIG. 1) of the saw 2 will become apparent from a description of the device for setting the teeth of a band saw. This device comprises a bed (FIG. 1) which mounts a flexible clamping device 4 (FIG. 2) for holding the saw in a partly floating position in the course of setting its teeth 1. The device 4 consists of a base 5 and a cover 6; installed between the base 5 and cover 6 is the saw 2 whose teeth 1 rest on a supporting element 7 whereas its back side rests on a spring-loaded supporting element 8.

The bed 3 mounts two impact elements 9 (FIG. 1, 2, 3) and 10 on both sides of the blade of the saw 2. These elements are installed with a provision for reciprocating in the opposite directions relative to each other for which purpose they are linked kinematically with a drive which is not shown in the drawings and can be of any suitable type. The surface 11 which will be referred to hereinafter as "working surface" of each impact element 9, 10, acting on the edge 12 (FIG. 4) of the flank "a" of the tooth 1 is inclined to the plane of the saw cross section to an angle $a$ (FIG. 1) which is equal to, say, 10°. The plane of the saw cross section is perpendicular to the straight line connecting the tooth points of the adjacent teeth 1 of the saw 2. The working surface 11 of each impact element 9, 10 has a convex curvilinear profile in cross section as shown in FIG. 3. Such a profile of the working surface 11 of the impact elements 9, 10 makes it possible to obtain contact between the edge 12 of the front or rear flank "a" of the tooth 1, in fact in the point which is transformed into a short zone during further deformation of the edge 12.

The bed 3 mounts a pitch feed mechanism 13 of the saw 2; the pawl 14 of said mechanism engages the tooth 1 of the saw 2 (the drive of the mechanism 13 is not shown; it can be of any suitable design).

The device for setting the teeth of a saw functions as follows.

The method according to the invention will be considered with reference to a band saw, utilizing the device described above.

The saw 2 with hardened points of the teeth 1 is placed on the base 5 and pressed down by the cover 6. Besides, the points of the saw teeth 1 rest on the supporting element 7 while the back side of the saw is pressed upon by a spring-loaded supporting element 8.

Then the saw is fed by pitch intervals with the aid of the feed mechanism 13 in the direction of arrow S. The impact elements are arranged relative to the teeth 1 of the saw 2 so that the line of contact of their working surface 11 with the edge 12 would be shifted from the point of the tooth 1 beyond the hardened zone of said point.

These preliminary operations completed, the drive of the device is started and the impact elements 9, 10 start reciprocating towards the saw 2, thus applying a dynamic effect to the teeth 1 of the saw 2; the direction of this reciprocating motion is shown by arrows $S_1$.

Depending on the method of hardening the points of the teeth 1 of the saw 2, the length of the hardened zones from the tooth point into the depth of the tooth 1 along its front and rear edges 12 will be different. The dynamic effect is applied along the edge 12 whose hardened zone is shortest.

If the impact elements 9 and 10 act on the front edge 12 of the tooth 1, the latter bends on a helical line; as a result, its stiffness grows with a corresponding increase in the strength and service life of the saw 2. Inasmuch as the dynamic effect is applied to the edge 12 of the tooth beyond the hardened zone of the point of the tooth 1, this ensures the accuracy of tooth setting and protects the tooth points against being chipped off.

If the impact elements 9 and 10 act on the rear edge 12 of the tooth 1, the bending radius of the tooth becomes larger than in the case of blows dealt to the front edge 12 of the tooth 1 and the auxiliary angle of the back of the tooth becomes smaller.

Having set one pair of teeth 1 of the saw 2 the impact elements 9 and 10 return to their respective positions and the pitch feed mechanism 13 of the saw 2 moves the saw by the pawl 14 to bring the next pair of teeth in position for setting.

What we claim is:

1. A method of setting the teeth of a saw comprising the step of applying a dynamic effect to only the edge of the flank of a free positioned saw tooth, at a predetermined distance from the point of said tooth for bending and twisting of the latter.

2. A device for setting teeth of a saw comprising: a bed; a flexible clamping device mounted on said bed and keeping the saw in a floating position in the course of tooth setting; a pitch feed mechanism of the saw mounted on said bed; at least two impact elements located on said bed, one of said elements being located on each side of the blade of said saw; said impact elements being installed for reciprocating in opposite directions relative to each other; the working surface of each of said impact elements acting on the edge of the tooth flank for bending and twisting the latter, said working surface being inclined to cross-sectional plane of the saw normal to a line connecting the points of two adjacent teeth and having a convex shape in cross section, the profile being inclined with respect to the cross-sectional plane of the saw; and means for driving said saw pitch feed mechanism, said impact elements being movable relative to each other, said impact elements acting on the edge of the tooth forming a helical tooth free of an anvil, said working surface being inclined with respect to the side surface of the saw.

* * * * *